United States Patent
Carmel et al.

(10) Patent No.: US 7,908,331 B2
(45) Date of Patent: Mar. 15, 2011

(54) EFFICIENT PRESENTATION OF RELATED MESSAGES IN A COMPUTER NETWORK-BASED MESSAGING SYSTEM

(75) Inventors: David Carmel, Haifa (IL); Yehudit Ovadia, Tirat Carmel (IL)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/177,907

(22) Filed: Jul. 23, 2008

(65) Prior Publication Data

US 2010/0023583 A1  Jan. 28, 2010

(51) Int. Cl.
*G06F 15/16* (2006.01)
(52) U.S. Cl. .................. 709/206; 709/226; 715/234
(58) Field of Classification Search ............ 709/206, 709/201–203, 217–226; 715/234–242; 707/692, 707/708, 755, 771, 811
See application file for complete search history.

(56) References Cited

U.S. PATENT DOCUMENTS

| 6,496,853 B1 | 12/2002 | Klein | |
| 7,627,641 B2 * | 12/2009 | Aslop et al. | 709/206 |
| 2002/0073117 A1 * | 6/2002 | Newman | 707/513 |
| 2002/0073157 A1 * | 6/2002 | Newman et al. | 709/206 |
| 2003/0163537 A1 | 8/2003 | Rohall | |
| 2006/0020668 A1 * | 1/2006 | Chen et al. | 709/206 |
| 2007/0038710 A1 | 2/2007 | Li | |

FOREIGN PATENT DOCUMENTS

EP  1327192 B1  4/2005

OTHER PUBLICATIONS

Kwok, Chong See, Method for eliminating and identifying redundant message information, Apr. 25, 2002, World Intellectual Property Organization, WO 02/33981 A2.*

* cited by examiner

*Primary Examiner* — Wing F Chan
*Assistant Examiner* — Ruolei Zong

(57) ABSTRACT

Efficient presentation of related messages in a computer network-based messaging system, including a message parser for parsing related messages into sub-messages, a comparator for comparing each sub-message identified by the parser to each sub-message in a set of unique sub-messages previously identified by the parser within any of the related messages, and adding to the set any of the sub-messages identified by the parser that are not members of the set, and a message presenter for marking with a visual indicator each of the related messages that contributes any sub-messages to the set, where the marked messages are visually distinguishable from all other of the related messages that do not contribute any sub-messages to the set.

22 Claims, 4 Drawing Sheets

Subject: Re: Project
Date: Wednesday, June 11, 2008 5:25 PM
From: Bob Smith
To: Dan Jones, Max Bach Dan, Max Then it's a go! Thanks.

Bob

----- Previous Message -----
From: Dan Jones
To: Bob Smith
Sent: Wednesday, June 11, 2008 5:16 PM
Subject: Re: Project Hey Bob, Looks good to me. Let's do it.

Dan

----- Previous Message -----
From: Bob Smith
To: Dan Jones
Sent: Wednesday, June 11, 2008 2:48 PM
Subject: Fw: Project Hi Dan, See Max's message below. What do you think?

Bob

----- Previous Message -----
From: Max Bach
To: Bob Smith
Sent: Wednesday, June 11, 2008 1:57 PM
Subject: Project Bob, I think we should move ahead on the project, but see what Dan says.

Max

Fig. 2

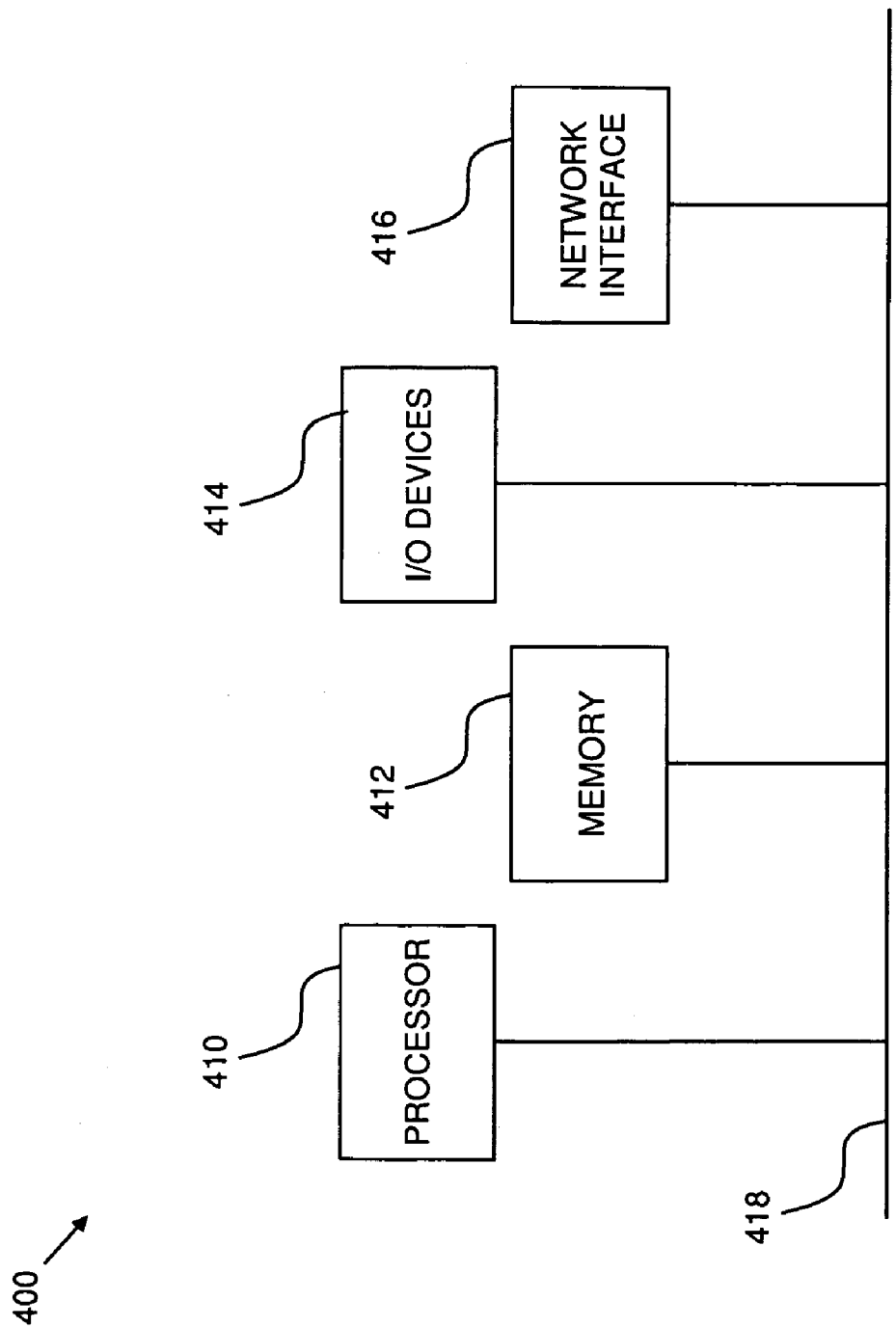

EFFICIENT PRESENTATION OF RELATED MESSAGES IN A COMPUTER NETWORK-BASED MESSAGING SYSTEM

FIELD OF THE INVENTION

The present invention relates to computer network-based messaging systems in general, and more particularly to efficient presentation of related messages in a computer network-based messaging system.

BACKGROUND OF THE INVENTION

When reading a long thread of email messages on a specific subject, a user who reads each message in the thread is likely to waste time reading some portions of the overall message content multiple times, as messages are often quoted and incorporated into other messages. A related problem concerns how to store the full thread in an efficient manner. Currently, email clients save all email messages in a thread, including duplicate messages that are incorporated into other messages, and even save duplicate attachments, where the same attachment appears in more than one of the messages in the thread.

SUMMARY OF THE INVENTION

The present invention in embodiments thereof discloses novel systems and methods for efficient presentation of related messages in a computer network-based messaging system.

In one aspect of the present invention a system is provided for efficient presentation of related messages in a computer network-based messaging system, the system including a message parser configured to parse at least one message in a group of related messages into at least one sub-message, a comparator configured to compare each sub-message identified by the parser to each sub-message in a set of unique sub-messages previously identified by the parser within any of the messages in the group, and add to the set any of the sub-messages identified by the parser that are not members of the set, and a message presenter configured to mark with a visual indicator each message in the group that contributes at least one of the unique sub-messages to the set, where the messages that are marked with the visual indicator are visually distinguishable from all other of the messages in the group that do not contribute at least one of the unique sub-messages to the set, and where any of the parser, comparator, and presenter are implemented in either of computer hardware and computer software and embodied in a computer-readable medium.

In another aspect of the present invention a method is provided for efficient presentation of related messages in a computer network-based messaging method, the method including parsing at least one message in a group of related messages into at least one sub-message, comparing each of the sub-messages to each sub-message in a set of unique sub-messages parsed from any of the messages in the group, adding to the set any of the sub-messages that are not members of the set, and marking with a visual indicator each message in the group that contributes at least one of the unique sub-messages to the set, thereby causing the messages that are marked with the visual indicator to be visually distinguishable from all other of the messages in the group that do not contribute at least one of the unique sub-messages to the set.

In another aspect of the present invention the parsing step includes identifying a plurality of sub-messages in the message along predefined section boundaries, where each of the sub-messages identified in the message include a different section of the message.

In another aspect of the present invention the parsing step includes parsing the messages in chronological order from the most recent message in the group to the oldest message in the group.

In another aspect of the present invention the parsing step includes defining a message attachment as a sub-message.

In another aspect of the present invention the comparing step includes determining whether any of the sub-messages match each other to within a predefined margin of error.

In another aspect of the present invention the adding step includes adding to the set all unique sub-messages found within a message in the group that is first to be parsed among all of the messages in the group.

In another aspect of the present invention the adding step includes storing any of the messages in the set together with an identifier identifying the message from which the sub-message came.

In another aspect of the present invention the marking step includes setting within an email client or an on-line discussion forum web page a flag associated with any of the messages that are to be marked.

In another aspect of the present invention the method further includes displaying the sub-messages that are in the set.

In another aspect of the present invention the method further includes deleting any of the messages in the group that do not contribute a unique sub-message to the set.

In another aspect of the present invention a computer-implemented program is provided embodied on a computer-readable medium, the computer program including a code segment operative to parse at least one message in a group of related messages into at least one sub-message, a code segment operative to compare each of the sub-messages to each sub-message in a set of unique sub-messages parsed from any of the messages in the group, a code segment operative to add to the set any of the sub-messages that are not members of the set, and a code segment operative to mark with a visual indicator each message in the group that contributes at least one of the unique sub-messages to the set, thereby causing the messages that are marked with the visual indicator to be visually distinguishable from all other of the messages in the group that do not contribute at least one of the unique sub-messages to the set.

BRIEF DESCRIPTION OF THE DRAWINGS

The present invention will be understood and appreciated more fully from the following detailed description taken in conjunction with the appended drawings in which:

FIG. 2 is an example of a message, useful in understanding the system of FIG. 1;

FIG. 4 is a simplified block diagram illustration of an exemplary hardware implementation of a computing system, constructed and operative in accordance with an embodiment of the present invention.

DETAILED DESCRIPTION OF THE INVENTION

Figure 1:
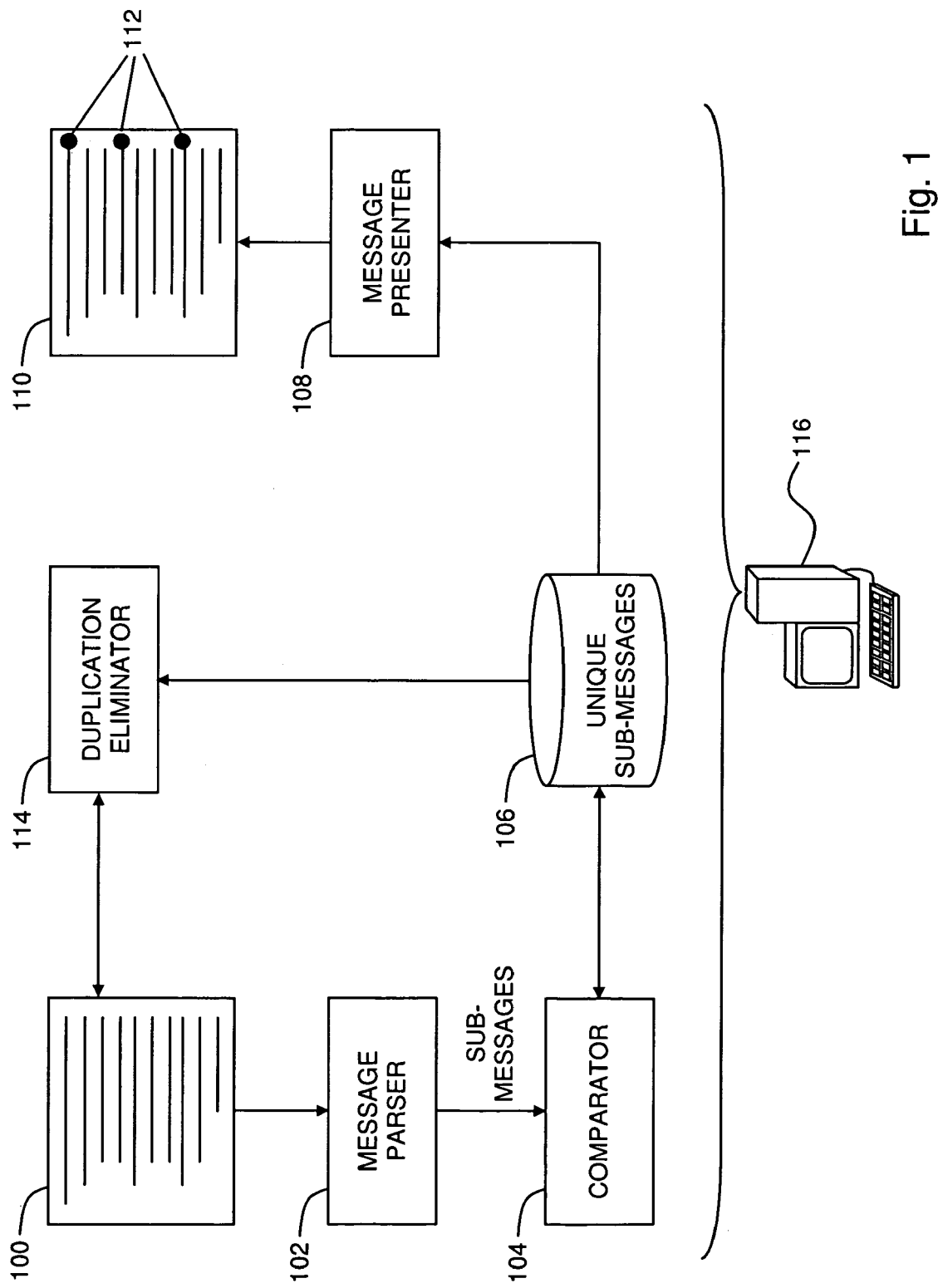
FIG. 1 is a simplified conceptual illustration of a system for efficient presentation of related messages in a computer network-based messaging system, constructed and operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for efficient presentation of related messages in a computer network-based messaging system, constructed and operative in accordance with an embodiment of the present invention. In the system of FIG. 1, a group 100 of related messages, such as email messages belonging to a common thread or messages that are posted to the same discussion topic on an on-line discussion forum, are parsed by a message parser 102, preferably in chronological order from the most recent message in group 100 to the oldest message in the group. Parser 102 processes each message by dividing the message into one or more sub-messages along predefined section boundaries, with each sub-message including a different section of the message. For example, a message that includes a section of content originating from the sender of the message followed by one or more sections of content copied from previously sent messages, is preferably divided into multiple sections at predefined section boundaries, such as before each occurrence of a predefined section boundary indicator such as the phrase " - - - Previous Message - - - " or other known indicator. An example of such a message is shown in FIG. 2. A message attachment optionally defines a sub-message as well.

A comparator 104 compares each sub-message identified by parser 102 to each sub-message in a set 106 of unique sub-messages previously found by parser 102 within the messages in group 100. Comparator 104 uses any suitable comparison technique to determine whether sub-messages match each other, preferably within a predefined margin of error. For the first message in group 100 processed by parser 102, set 106 is empty, and comparator 104 adds all unique sub-messages found within the first message to set 106. For each subsequent message in group 100 processed by parser 102, each sub-message that is found by comparator 104 not to match any other sub-message found in set 106 is added by comparator 104 to set 106. Each sub-message is preferably stored in set 106 together with an identifier identifying the message from which the sub-message came.

A message presenter 108 preferably presents a modified view 110 of the messages in group 100, such as by marking with a visual indicator 112 each message in group 100 that contributes a unique sub-message to set 106, where messages that are marked in this manner are visually distinguishable from the other messages in group 100 that do not contribute a unique sub-message to set 106. This may be accomplished by setting a flag associated with each message to be marked within an email client message display window or an on-line discussion forum web page. In this manner, a user who peruses a listing of the messages in view 110 may select and read only those messages that are marked with indicator 112 and be assured that the selected messages include all unique sub-messages found in all messages in group 100. Additionally or alternatively, message presenter 108 displays the sub-messages found in set 106. Additionally or alternatively, a duplication eliminator 114 preferably deletes any messages in group 100 that do not contribute a unique sub-message to set 106.

Any of the elements shown in FIG. 1 are preferably executed by or otherwise made accessible to a computer 116, such as by implementing any of the elements shown in FIG. 1 in computer hardware and/or in computer software embodied in a computer-readable medium in accordance with conventional techniques.

Figure 3:
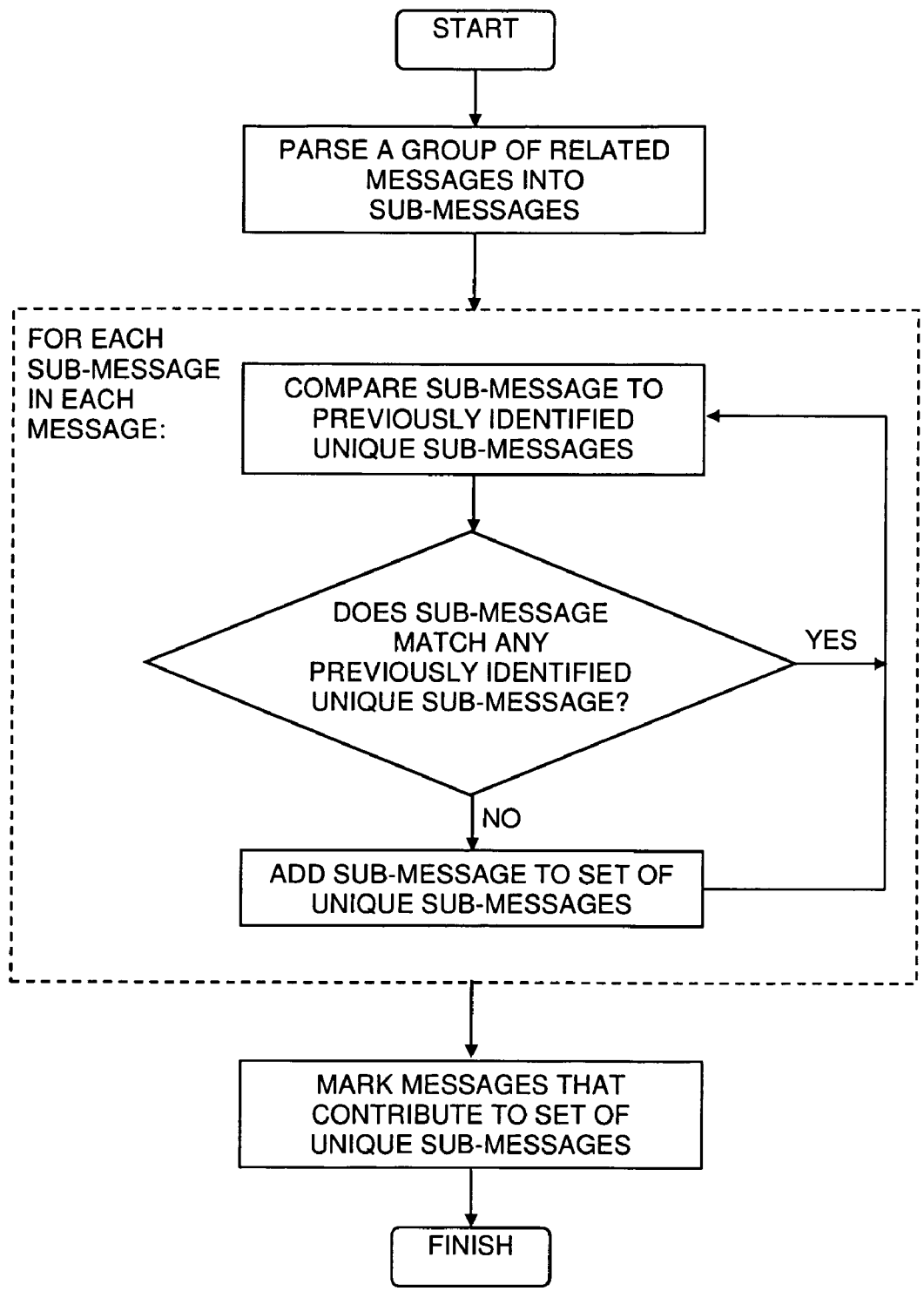
FIG. 3 is a simplified flowchart illustration of an exemplary method of operation of the system of FIG. 1, operative in accordance with an embodiment of the present invention.

Reference is now made to FIG. 3, which is a simplified flowchart illustration of an exemplary method of operation of the system of FIG. 1, operative in accordance with an embodiment of the present invention. In the method of FIG. 3 a group of related messages are parsed, preferably in chronological order from the most recent message in the group to the oldest message in the group, by dividing each message into one or more sub-messages along predefined section boundaries. Each sub-message is compared to the sub-messages in a set of unique sub-messages that have been previously identified within the group of messages. Any sub-message found in a message that does not match any sub-message in the set of unique sub-messages, such as to within a predefined margin of error, is then added to the set of unique sub-messages. Any message in the group that contributes a unique sub-message to the set of unique sub-messages is preferably marked with an indicator and displayed showing the indicator. Additionally or alternatively, the sub-messages found in the set of unique sub-messages may be displayed. Additionally or alternatively, any messages in the group that do not contribute a unique sub-message to the set of unique sub-messages is deleted from the group.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the present invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for efficient presentation of related messages in a computer network-based messaging system, the system comprising:

a message parser configured to parse at least one message in a group of related messages into at least one sub-message;

a comparator configured to compare each sub-message identified by said parser to each sub-message in a set of unique sub-messages previously identified within any of said messages in said group, and add to said set any of said sub-messages identified by said parser that are not members of said set; and a message presenter configured to present a listing of a plurality of said messages in said group of related messages, wherein said listing includes at least one message in said group that does not contribute at least one of said unique sub-messages to said set of unique sub-messages, and wherein said listing includes at least one message in said group that does contribute at least one of said unique sub-messages to said set of unique sub-messages, and mark with a visual indicator only those of said messages in said listing that contributes at least one of said unique sub-messages to said set of unique sub-messages, wherein said messages in said listing that are marked with said visual indicator are visually distinguishable from all other of said messages in said group that do not contribute at least one of said unique sub-messages to said set, wherein said message parser, presenter, and comparator are implemented in at least one of
a) computer hardware, and
b) computer software embodied in a non-transitory computer-readable storage medium.

2. A system according to claim 1 wherein said parser is configured to identify a plurality of sub-messages in said message along predefined section boundaries, wherein each of said sub-messages identified in said message include a different section of said message.

3. A system according to claim 1 wherein said messages are email messages belonging to a common thread or messages that are posted to a discussion topic on an on-line discussion forum.

4. A system according to claim 1 wherein said parser parses said messages in chronological order from the most recent message in said group to the oldest message in said group.

5. A system according to claim 1 wherein said parser is configured to define a message attachment as a sub-message.

6. A system according to claim 1 wherein said comparator is configured to determine whether any of said sub-messages match each other to within a predefined margin of error.

7. A system according to claim 1 wherein said comparator is configured to add to said set all unique sub-messages found within a message in said group that is first to be parsed by said parser among all of said messages in said group.

8. A system according to claim 1 wherein said comparator is configured to store any of said messages in said set together with an identifier identifying the message from which said sub-message came.

9. A system according to claim 1 wherein said presenter is configured to set within an email client or an on-line discussion forum web page a flag associated with any of said messages that are to be marked.

10. A system according to claim 1 wherein said presenter is configured to display said sub-messages that are in said set.

11. A system according to claim 1 and further comprising a duplication eliminator configured to delete any of said messages in said group that do not contribute a unique sub-message to said set.

12. A method for efficient presentation of related messages in a computer network-based messaging method, the method comprising:
parsing at least one message in a group of related messages into at least one sub-message;
comparing each of said sub-messages to each sub-message in a set of unique sub-messages parsed from any of said messages in said group;
adding to said set of unique sub-messages any of said sub-messages that are not members of said set;
presenting a listing of a plurality of said messages in said group of related messages, wherein said listing includes at least one message in said group that does not contribute at least one of said unique sub-messages to said set of unique sub-messages, and wherein said listing includes at least one message in said group that does contribute at least one of said unique sub-messages to said set of unique sub-messages, and
marking with a visual indicator only those of said messages in said listing that contributes at least one of said unique sub-messages to said set of unique sub-messages, thereby causing said messages in said listing that are marked with said visual indicator to be visually distinguishable from all other of said messages in said group that do not contribute at least one of said unique sub-messages to said set.

13. A method according to claim 12 wherein said parsing step comprises identifying a plurality of sub-messages in said message along predefined section boundaries, wherein each of said sub-messages identified in said message include a different section of said message.

14. A method according to claim 12 wherein said parsing step comprises parsing said messages in chronological order from the most recent message in said group to the oldest message in said group.

15. A method according to claim 12 wherein said parsing step comprises defining a message attachment as a sub-message.

16. A method according to claim 12 wherein said comparing step comprises determining whether any of said sub-messages match each other to within a predefined margin of error.

17. A method according to claim 12 wherein said adding step comprises adding to said set all unique sub-messages found within a message in said group that is first to be parsed among all of said messages in said group.

18. A method according to claim 12 wherein said adding step comprises storing any of said messages in said set together with an identifier identifying the message from which said sub-message came.

19. A method according to claim 12 wherein said marking step comprises setting within an email client or an on-line discussion forum web page a flag associated with any of said messages that are to be marked.

20. A method according to claim 12 and further comprising displaying said sub-messages that are in said set.

21. A method according to claim 12 and further comprising deleting any of said messages in said group that do not contribute a unique sub-message to said set.

22. A computer program product for efficient presentation of related messages in a computer network-based messaging system, the computer program product comprising:
a non-transitory computer-readable storage medium: and
computer-readable program code embodied in the non-transitory computer-readable storage medium, wherein the computer-readable program code is configured to
compare each of said sub-messages to each sub-message in a set of unique sub-messages parsed from any of said messages in said group,
add to said set of unique sub-messages any of said sub-messages that are not members of said set,
present a listing of a plurality of said messages in said group of related messages, wherein said listing includes at least one message in said group that does not contribute at least one of said unique sub-messages to said set of unique sub-messages, and wherein said listing includes at least one message in said group that does contribute at least one of said unique sub-messages to said set of unique sub-messages, and
compare mark with a visual indicator only those of said messages in said listing that contributes at least one of said unique sub-messages to said set of unique sub-messages, thereby causing said messages in said listing that are marked with said visual indicator to be visually distinguishable from all other of said messages in said group that do not contribute at least one of said unique sub-messages to said set.

* * * * *